United States Patent
Zeng et al.

(10) Patent No.: US 10,703,938 B2
(45) Date of Patent: Jul. 7, 2020

(54) HOT-MELT ADHESIVE AND PREPARATION METHOD THEREFOR

(71) Applicants: KUNSHAN TIANYANG HOT MELT ADHESIVE CO., LTD., Jiangsu (CN); SHANGHAI TIANYANG HOT MELT ADHESIVE CO., LTD., Shanghai (CN); EAST CHINA UNIVERSITY OF SCIENCE AND TECHNOLOGY, Shanghai (CN)

(72) Inventors: Zuoxiang Zeng, Shanghai (CN); Xingquan Ma, Shanghai (CN); Zhelong Li, Jiangsu (CN)

(73) Assignees: KUNSHAN TIANYANG HOT MELT ADHESIVE CO., LTD, Kunshan, Jiangsu (CN); SHANGHAI TIANYANG HOT MELT ADHESIVE CO., LTD, Shanghai (CN); EAST CHINA UNIVERSITY OF SCIENCE AND TECHNOLOGY, Shanghai (CN)

( * ) Notice: Subject to any disclaimer, the term of this patent is extended or adjusted under 35 U.S.C. 154(b) by 90 days.

(21) Appl. No.: 16/064,235

(22) PCT Filed: Dec. 16, 2016

(86) PCT No.: PCT/CN2016/110282
§ 371 (c)(1),
(2) Date: Jun. 20, 2018

(87) PCT Pub. No.: WO2017/107859
PCT Pub. Date: Jun. 29, 2017

(65) Prior Publication Data
US 2019/0010363 A1  Jan. 10, 2019

(30) Foreign Application Priority Data
Dec. 21, 2015  (CN) .......................... 2015 1 0960198

(51) Int. Cl.
| C09J 5/06 | (2006.01) |
| C09J 11/06 | (2006.01) |
| C09J 11/08 | (2006.01) |
| C08G 69/26 | (2006.01) |
| C08G 69/36 | (2006.01) |
| C09J 177/06 | (2006.01) |

(52) U.S. Cl.
CPC .............. *C09J 5/06* (2013.01); *C08G 69/265* (2013.01); *C08G 69/36* (2013.01); *C09J 11/06* (2013.01); *C09J 11/08* (2013.01); *C09J 177/06* (2013.01); *C09J 2427/00* (2013.01); *C09J 2451/00* (2013.01); *C09J 2493/00* (2013.01); *C09J 2495/00* (2013.01)

(58) Field of Classification Search
None
See application file for complete search history.

(56) References Cited

U.S. PATENT DOCUMENTS

| 3,989,678 A * | 11/1976 | Furukawa | ............... C08G 69/36 528/324 |
| 4,024,116 A * | 5/1977 | Horn | ....................... C08G 69/40 528/324 |
| 5,268,404 A | 7/1993 | Mowrey | |

FOREIGN PATENT DOCUMENTS

| CN | 1255524 A | 6/2000 |
| CN | 1415685 A | 5/2003 |
| CN | 1458215 A | 11/2003 |
| CN | 101463244 A | 6/2009 |
| CN | 101792641 A | 8/2010 |
| CN | 103756577 A | 4/2014 |
| CN | 103045111 B | 5/2014 |
| CN | 103059792 B | 8/2014 |
| CN | 104893648 A | 9/2015 |
| CN | 105349088 A | 2/2016 |
| EP | 0442700 B1 | 1/1996 |

* cited by examiner

*Primary Examiner* — Ana L. Woodward
(74) *Attorney, Agent, or Firm* — Muncy, Geissler, Olds & Lowe, P.C.

(57) ABSTRACT

A novel hot-melt adhesive and a preparation method thereof are disclosed, and in particular a hot-melt adhesive for bonding aluminum, stainless steel or other metal materials and PVC plastics is disclosed. The specific nylon-type copolyamide is firstly prepared by designing specific raw materials and percentage thereof, and in combination with favorable bonding properties of the nylon-type copolyamide for metals and favorable bonding characteristics of the perchloroethylene resin for PVC, a double screw extruder is utilized to perform sufficient melt blending on the nylon-type copolyamide and the perchloroethylene resin under the synergistic actions of related aids, so that the obtained novel hot-melt adhesive has favorable bonding properties for both metals and PVC.

9 Claims, No Drawings

HOT-MELT ADHESIVE AND PREPARATION METHOD THEREFOR

TECHNICAL FIELD

The present invention relates to a novel hot-melt adhesive and a preparation method therefor, and in particular to a hot-melt adhesive for bonding aluminum, stainless steel or other metal materials and PVC plastics.

BACKGROUND

Polyvinyl chloride (PVC) is a kind of widely used plastics. The global PVC output can reach 50 million tons per year, and the waste PVC produced each year can reach 10 million tons. How to recycle it is not only an economic problem, but also an environmental problem. The bonding of waste PVC and a metal sheet to form a plastic-steel composite material using the metal as the panel has wide applicability. If the adhesive for bonding is an environment-friendly hot-melt adhesive, the aforementioned two problems related to waste PVC can be solved at the same time, which not only brings in great economic effects, but also has a positive effect on environmental protection.

At present, the bonding of plastics and metals is mainly implemented by direct bonding by using liquid adhesives such as epoxy adhesives and polyurethane adhesives, and the liquid adhesives contain volatile substances which can easily pollute the environment, and are not convenient for manufacturing operations. The hot-melt adhesive is free of solvents, thus, does not pollute the environment, is convenient for manufacturing operations and is beneficial to large-scale rapid operation of the factory.

The patent CN101792641A discloses an adhesive for an aluminum alloy and a PVC film, which is a fast-curing adhesive; and the solvent drying procedure of the adhesive is shortened, but the storage time of the adhesive is shorter, which is inconvenient for practical applications. The patent CN103059792B discloses a polyester elastomer hot-melt adhesive for bonding a polar polymer and a metal material and a preparation method thereof; however, this hot-melt adhesive has low bonding properties for PVC and poor water resistance. The patent CN103756577A discloses a PVC/metal-bonding hot-melt adhesive film and a preparation method thereof; however, the hot-melt adhesive has short bonding and attachment effectiveness for metals, can easily become unglued from the metals, and has poor overall peel strength. The patent CN103045111B discloses a copolyester-based hot-melt adhesive, which can be used for bonding metals and polar materials, but has obvious defects; and it can be seen from the embodiments that the application temperature of the hot-melt adhesive disclosed in this invention is 138° C., but the heat resistance of PVC is poor, and the bonding at the temperature of 138° C. is most likely to cause deformation of the PVC.

In conclusion, the bonding properties of the existing hot-melt adhesives for metals and PVC plastics cannot satisfy the demands in the aspect of practical applications. The development of a novel hot-melt adhesive, which is specially used to bond metals and PVC plastics, has become an urgent problem to be solved.

SUMMARY OF THE INVENTION

The present invention aims to solve the above-mentioned technical problem and provide a novel hot-melt adhesive and a preparation method thereof, so that the novel hot-melt adhesive prepared according to the present invention can satisfy the requirements for bonding metals and PVC plastics.

The technical scheme adopted by the present invention is as follows: a novel hot-melt adhesive is provided, which has the following raw materials, in percentage by mass, including: nylon-type copolyamide of 63% to 70%, perchloroethylene resin of 15% to 20%, tackifier of 13% to 17%, silane coupling agent of 0.3% to 1% and plasticizer of 0.5% to 1%.

The forementioned nylon-type copolyamide is prepared by performing copolymerization on four main raw materials which include caprolactam, nylon 66 salt (hexamethylene-diamine adipate), nylon 612 salt (polyhexamethylene dodecanamide) and nylon 1010 salt (decamethylene diamine sebacate), under actions of proper amounts of water and stearic acid; the mole percents of the four main raw materials are respectively 33% to 40%, 32% to 38%, 15% to 20% and 12% to 16%; and a mole ratio of the stearic acid to the caprolactam is 0.02:1 to 0.03:1.

The perchloroethylene resin has a chlorine content of 61% to 65%.

The tackifier is one selected from the group consisting of rosin, terpene resin and hydrogenated petroleum resin.

The silane coupling agent is one selected from the group consisting of vinyltrimethoxysilane, vinyltriethoxysilane, N-(β-aminoethyl)-γ-aminopropyltriethoxysilane and γ-aminopropyltrimethoxysilane.

The plasticizer is one of dioctyl adipate and dioctyl sebacate.

The preparation method of the novel hot-melt adhesive includes the following steps:

1) selecting raw materials according to the raw materials, in percentage by mass, of the novel hot-melt adhesive of any one of claims 1 to 5;

2) preparing nylon-type copolyamide;

3) adding the prepared nylon-type copolyamide, perchloroethylene resin, tackifier, silane coupling agent and plasticizer into a mixer according to preset percents, and stirring uniformly; and 4) adding the mixture into a double screw extruder, and performing melt extrusion at a temperature of 100° C. to 130° C. to obtain the novel hot-melt adhesive.

After step 4), the novel hot-melt adhesive can be made into a hot-melt adhesive film according to actual demands. The preparation step is performing casting on the novel hot-melt adhesive by using a casting machine or performing coating by using a hot-melt coater to prepare the novel hot-melt adhesive film, the novel hot-melt adhesive film has a thickness of 0.1 mm.

In step 2), the method for preparing nylon-type copolyamide includes the following steps in the sequence set forth:

2a) proportionally mixing caprolactam, nylon 66 salt, nylon 612 salt and nylon 1010 salt, and adding the mixture into a high-pressure reaction kettle;

2b) adding stearic acid and water into the high-pressure reaction kettle, and performing nitrogen replacement and vacuumizing to remove all air in the reaction kettle;

2c) introducing high-purity nitrogen, heating to 230° C., holding to react for 3 hours under a pressure of 1.0 MPa to 1.2 MPa, reducing the pressure to an ordinary pressure, continuing reducing the pressure to 0.05 MPa, and performing dewatering for 1 hour; and 2d) discharging to obtain the nylon-type copolyamide.

The prepared nylon-type copolyamide can be made into other types according to actual demands, such as strips, granules, powder or the like.

In the steps of the method for preparing the nylon-type copolyamide, the amount of water added in step 2b) can be self-adjusted according to actual demands as long as hydrolysis and ring opening of caprolactam are implemented.

The innovation of the present invention lies in that the specific nylon-type copolyamide is firstly prepared by designing specific raw materials and percentage thereof, and in combination with favorable bonding properties of the nylon-type copolyamide for metals and favorable bonding characteristics of the perchloroethylene resin for PVC, the double screw extruder is utilized to perform sufficient melt blending on the nylon-type copolyamide and the perchloroethylene resin under the synergistic actions of related aids, so that the obtained novel hot-melt adhesive has favorable bonding properties for both metals and PVC. Compared with the existing solvent-type or reactive liquid adhesive, the novel hot-melt adhesive prepared according to the present invention can implement fast bonding between metals and PVC plastics by using a laminating machine or hot press, and thus, has the advantages of simple technique and high bonding speed. Meanwhile, in actual applications, the novel hot-melt adhesive prepared according to the present invention can perform effective bonding at the temperature of 80° C. or so; and thus, the novel hot-melt adhesive has lower application temperature, is convenient for operation, and cannot damage the PVC material.

DETAILED DESCRIPTION OF PREFERRED EMBODIMENTS

The present invention is further described below by way of embodiments, but it is not limited thereto.

Embodiment 1

Preparation of nylon-type copolyamide includes the steps: mixing 90.44 g of caprolactam, 199.35 g of nylon 66 salt, 103.89 g of nylon 612 salt and 97.32 g of nylon 1010 salt, and adding the mixture into a 2 L high-pressure reaction kettle with a stirrer, a thermometer and a pressure meter; adding 4.836 g of stearic acid and 70 g of deionized water, and performing nitrogen replacement and vacuumizing to remove all air in the reaction kettle; introducing 0.2 MPa high-purity nitrogen, slowly heating to 230° C., holding to react for 3 hours under a pressure of 1.0 MPa to 1.2 MPa, slowly reducing the pressure to ordinary pressure, continuing reducing the pressure to 0.05 MPa, and performing dewatering for 1 hour; and discharging and granulating to obtain the granular nylon-type copolyamide (PA-1). According to the national standard GB/T3682-2000, it is detected that the DSC final melting point of the PA-1 is 88° C., and the melt flow rate is 48 g/10 min/160° C./2.16 kg.

Preparation of the novel hot-melt adhesive involves adding 400 g of the nylon-type copolyamide (PA-1), 117.46 g of perchloroethylene resin, 107.94 g of rosin, 6.35 g of vinyltrimethoxysilane and 3.17 g of dioctyl adipate into a high-speed mixer, and uniformly mixing; adding the mixture into a TE35 double screw extruder, and controlling the temperature of a first region of the extruder at 100° C., the temperature of a second region at 110° C., the temperatures of third to fifth regions at 120° C., the temperature of a sixth region at 115° C., the die temperature at 100° C. and the screw speed at 30 r/min; and discharging, and performing casting and cooling to prepare the 0.10 mm hot-melt adhesive film. The adhesive film sample is marked as A1.

Embodiment 2

Preparation of nylon-type copolyamide includes the steps: mixing 106.4 g of caprolactam, 170.5 g of nylon 66 salt, 107.35 g of nylon 612 salt and 89.83 g of nylon 1010 salt, and adding the mixture into a 2 L high-pressure reaction kettle with a stirrer, a thermometer and a pressure meter; adding 4.552 g of stearic acid and 80 g of deionized water, and performing nitrogen replacement and vacuumizing to remove all air in the reaction kettle; introducing 0.2 MPa high-purity nitrogen, slowly heating to 230° C., holding to react for 3 hours under a pressure of 1.0 MPa to 1.2 MPa, slowly reducing the pressure to ordinary pressure, continuing reducing the pressure to 0.05 MPa, and performing dewatering for 1 hour; and discharging and granulating to obtain the granular nylon-type copolyamide (PA-2). According to the national standard GB/T3682-2000, it is detected that the DSC final melting point of the PA-2 is 91° C., and the melt flow rate is 43.8 g/10 min/160° C./2.16 kg.

Preparation of the novel hot-melt adhesive involves adding 400 g of the nylon-type copolyamide (PA-2), 88.24 g of perchloroethylene resin, 94.12 g of terpene resin, 2.94 g of vinyltriethoxysilane and 2.94 g of dioctyl adipate into a high-speed mixer, and uniformly mixing; adding the mixture into a TE35 double screw extruder, and performing melt blending; and discharging, and performing casting and cooling to prepare the 0.10 mm hot-melt adhesive film. The adhesive film sample is marked as A2.

Embodiment 3

Preparation of nylon-type copolyamide includes the steps: mixing 87.78 g of caprolactam, 173.12 g of nylon 66 salt, 138.52 g of nylon 612 salt and 104.8 g of nylon 1010 salt, and adding the mixture into a 2 L high-pressure reaction kettle with a stirrer, a thermometer and a pressure meter; adding 5.633 g of stearic acid and 60 g of deionized water, and performing nitrogen replacement and vacuumizing to remove all air in the reaction kettle; introducing 0.2 MPa high-purity nitrogen, slowly heating to 230° C., holding to react for 3 hours under a pressure of 1.0 MPa to 1.2 MPa, slowly reducing the pressure to ordinary pressure, continuing reducing the pressure to 0.05 MPa, and performing dewatering for 1 hour; and discharging and granulating to obtain the granular nylon-type copolyamide (PA-3). According to the national standard GB/T3682-2000, it is detected that the DSC final melting point of the PA-3 is 85° C., and the melt flow rate is 43.8 g/10 min/160° C./2.16 kg.

Preparation of the novel hot-melt adhesive involves adding 400 g of the nylon-type copolyamide (PA-3), 89.71 g of perchloroethylene resin, 74.29 g of terpene resin, 1.71 g of γ-aminopropyltrimethoxysilane and 5.71 g of dioctyl sebacate into a high-speed mixer, and uniformly mixing; adding the mixture into a TE35 double screw extruder, and performing melt blending; and discharging, and performing casting and cooling to prepare the 0.10 mm hot-melt adhesive film. The adhesive film sample is marked as A3.

Embodiment 4

Preparation of nylon-type copolyamide includes the steps: mixing 97.09 g of caprolactam, 167.87 g of nylon 66 salt, 107.35 g of nylon 612 salt and 119.78 g of nylon 1010 salt, and adding the mixture into a 2 L high-pressure reaction kettle with a stirrer, a thermometer and a pressure meter; adding 4.776 g of stearic acid and 70 g of deionized water, and performing nitrogen replacement and vacuumizing to remove all air in the reaction kettle; introducing 0.2 MPa high-purity nitrogen, slowly heating to 230° C., holding to react for 3 hours under a pressure of 1.0 MPa to 1.2 MPa, slowly reducing the pressure to ordinary pressure, continuing reducing the pressure to 0.05 MPa, and performing dewatering for 1 hour; and discharging and granulating to obtain the granular nylon-type copolyamide (PA-4). According to the national standard GB/T3682-2000, it is detected that the DSC final melting point of the PA-4 is 83° C., and the melt flow rate is 53.2 g/10 min/160° C./2.16 kg.

Preparation of the novel hot-melt adhesive involves adding 400 g of the nylon-type copolyamide (PA-4), 125 g of perchloroethylene resin, 90 g of hydrogenated petroleum resin, 6.25 g of N-(β-aminoethyl)-γ-aminopropyltriethoxysilane and 3.75 g of dioctyl sebacate into a high-speed mixer, and uniformly mixing; adding the mixture into a TE35 double screw extruder, and performing melt blending; and discharging, and performing casting and cooling to prepare the 0.10 mm hot-melt adhesive film. The adhesive film sample is marked as A4.

Performance Testing

The 180° peel strength of each adhesive film sample is tested after each adhesive film sample is utilized for bonding PVC/aluminum and PVC/stainless steel by hot pressing for 20 seconds under the conditions of 80° C. and 0.3 Mpa. Refer to GB/T2790-1995 for the testing method, and refer to Table 1 for test results.

TABLE 1

Bonding strength of the hot-melt adhesive film obtained in each embodiment for PVC/metal.

| Embodiment | Peel Strength (N/25 mm) | |
|---|---|---|
| | PVC/Aluminum | PVC/Stainless Steel |
| Embodiment 1 | 89 | 97 |
| Embodiment 2 | 90 | 99 |
| Embodiment 3 | 101 | 108 |
| Embodiment 4 | 94 | 101 |

From the above table, it can be seen that the novel hot-melt adhesive prepared according to the present invention has favorable bonding strength for metals and PVC. In practical applications, the hot pressing temperature is lower (80° C.), and cannot damage the PVC material; and the hot pressing time is shorter (20 seconds), which is convenient for construction and operation.

What is claimed is:

1. A novel hot-melt adhesive, produced from raw materials of copolyamide, perchloroethylene resin, tackifier, silane coupling agent and plasticizer, which are provided in percentages by mass:
   copolyamide of 63% to 70%;
   perchloroethylene resin of 15% to 20%;
   tackifier of 13% to 17%;
   silane coupling agent of 0.3% to 1%; and
   plasticizer of 0.5% to 1%;
   wherein: the copolyamide is prepared by performing copolymerization on four main raw materials which include caprolactam, nylon 66 salt, nylon 612 salt and nylon 1010 salt, under actions of proper amounts of water and stearic acid; the four main raw materials respectively have percentages by mass of 17.4% to 19.7%, 34.1% to 40.6%, 21.2% to 27.5% and 18.9% to 24.3%; and a mole ratio of the stearic acid to the caprolactam is 0.02:1 to 0.03:1,
   wherein a sum total of the percentages of copolyamide, perchloroethylene resin, tackifier, silane coupling agent, and plasticizer is 100%, and a sum total of the percentages of caprolactam, nylon 66 salt, nylon 612 salt and nylon 1010 salt is 100%.

2. The novel hot-melt adhesive of claim 1, wherein the perchloroethylene resin has a chlorine content of 61% to 65%.

3. The novel hot-melt adhesive of claim 1, wherein the tackifier is one selected from the group consisting of rosin, terpene resin and hydrogenated petroleum resin.

4. The novel hot-melt adhesive of claim 1, wherein the silane coupling agent is one selected from the group consisting of vinyltrimethoxysilane, vinyltriethoxysilane, N-(β-aminoethyl)-γ-aminopropyltriethoxysilane and γ-aminopropyltrimethoxysilane.

5. The novel hot-melt adhesive of claim 1, wherein the plasticizer is one of dioctyl adipate and dioctyl sebacate.

6. A preparation method of the novel hot-melt adhesive of claim 1, comprising the following steps:
   1) selecting raw materials according to preset percentages by mass, of the novel hot-melt adhesive;
   2) preparing the copolyamide;
   3) adding the prepared copolyamide, perchloroethylene resin, tackifier, silane coupling agent and plasticizer into a mixer according to preset percentages, and stirring uniformly; and
   4) adding the mixture into a double screw extruder, and performing melt extrusion at a temperature of 100° C. to 130° C. to obtain the novel hot-melt adhesive.

7. The preparation method of the novel hot-melt adhesive of claim 6, wherein in step 2), the method for preparing copolyamide comprises the following steps in the sequence set forth:
   2a) proportionally mixing caprolactam, nylon 66 salt, nylon 612 salt and nylon 1010 salt, and adding the mixture into a high-pressure reaction kettle;
   2b) adding stearic acid and water into the high-pressure reaction kettle, and performing nitrogen replacement and vacuumizing to remove all air in the reaction kettle;
   2c) introducing high-purity nitrogen, heating to 230° C., holding to react for 3 hours under a pressure of 1.0 MPa to 1.2 MPa, reducing the pressure to an ordinary pressure, continuing reducing the pressure to 0.05 MPa, and performing dewatering for 1 hour; and
   2d) discharging to obtain the copolyamide.

8. A preparation method of a novel hot-melt adhesive film, comprising the steps contained in the preparation method according to claim 6, and further comprising the following step:
   5) performing casting on the novel hot-melt adhesive by using a casting machine or performing coating by using a hot-melt coater to prepare the novel hot-melt adhesive film.

9. A novel hot-melt adhesive film, prepared by the preparation method of claim 8, wherein the novel hot-melt adhesive film has a thickness of 0.1 mm.

* * * * *